Dec. 16, 1924.
L. E. ANDERSON
1,519,347
CONTROLLING DEVICE FOR LIQUID RECEPTACLES
Original Filed March 10, 1915
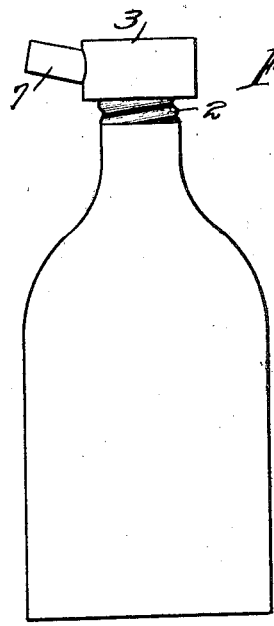
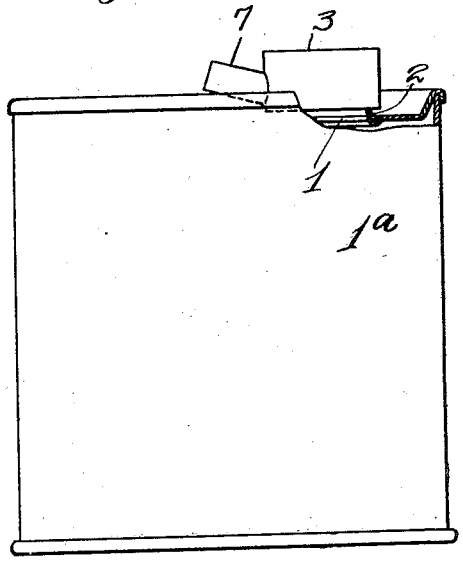
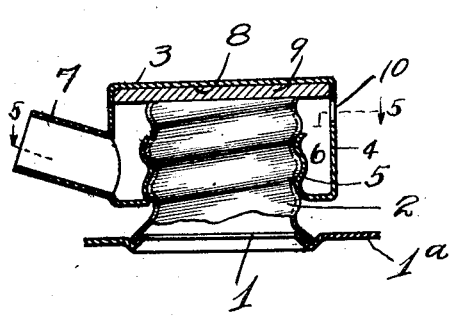
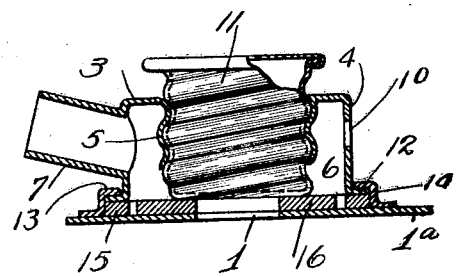
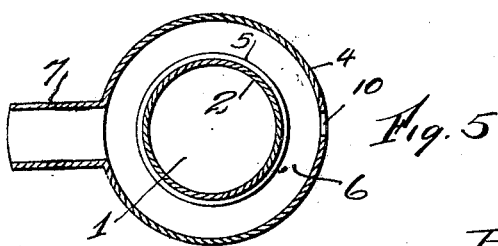
Inventor
Lossie E. Anderson.
by Parker & Carter
his Attys.

Patented Dec. 16, 1924.

1,519,347

UNITED STATES PATENT OFFICE.

LOSSIE E. ANDERSON, OF CHICAGO, ILLINOIS, ASSIGNOR OF ONE-HALF TO W. E. WARWICK, OF CHICAGO, ILLINOIS.

CONTROLLING DEVICE FOR LIQUID RECEPTACLES.

Application filed March 10, 1915, Serial No. 13,480. Renewed November 10, 1920. Serial No. 423,177.

*To all whom it may concern:*

Be it known that I, LOSSIE E. ANDERSON, a citizen of the United States, residing at Chicago, in the county of Cook and State of Illinois, have invented a certain new and useful Improvement in Controlling Devices for Liquid Receptacles, of which the following is a specification.

This invention relates to controlling devices for liquid receptacles and has for its object to provide a new and improved controlling device of this description, by means of which the liquid may be poured out of the receptacle.

The invention is illustrated in the accompanying drawings, wherein—

Figure 1 is a view showing the invention as applied to a can;

Figure 2 is a view showing the invention applied to a bottle;

Figure 3 is an enlarged vertical sectional view through the controlling device;

Figure 4 is a view similar to Fig 3, showing a modified construction;

Figure 5 is a sectional view taken on line 5—5 of Fig. 3.

Like numerals refer to like parts throughout the several figures.

Referring now to Figs. 1 and 3, I have shown the invention as applied to a can for holding liquids of any description. The can 1ª is provided at the top with a suitable opening 1, and surrounding this opening is a projecting part 2, which as shown in Fig. 3, is threaded. A spout carrying part 3 is associated with the part 2, the spout carrying part having two walls 4 and 5, which are substantially parallel and which are separated by a space 6. The wall 5 is screw threaded so as to engage the screw threads on the part 2. The wall 4 is provided with a spout 7, which connects with the interior space 6. In the construction shown in Fig. 3 the spout carrying part is provided with a top piece 8, which engages the top of the part 2 when the part 2 and the spout carrying part are moved relatively, so as to close the receptacle and prevent the escape of the liquid. I prefer to provide a packing piece 9, which directly engages the end of the part 2, as by means of such a piece it is easier to make a tight closing joint. The spout carrying part is provided with an air hole 10, preferably on the side opposite the spout 7. It will be seen that by slightly unscrewing the spout carrying part the packing 9 is separated from the end of the part 2, permitting the liquid to pass out of the part 2 into the space 6, and thence out the spout 5 when the receptacle is tilted. By again screwing down the spout carrying part a tight joint is secured and the escape of the liquid stopped.

In Fig. 4 I have shown a modified construction. In this construction the spout carrying part 3 is fastened to the can or receptacle 1ª, and the part 2 is, as it were, separated from the can so as to form a separate plug 11. The spout carrying part is preferably connected with the can 1ª so that it may be rotated to bring the spout around to any desired point so that the spout may be projected over the edge when pouring, and may be turned back when the can is closed, so as to be out of the way. In this construction the spout carrying part is provided with a flange 12, which projects under a flange 13 on the upstanding part 14 connected with the top of the can and surrounding the opening 1. A packing 15 is located under the flange 12 which acts to permit the spout carrying part to be rotated and yet insure a tight joint. The spout carrying part in this construction has the two walls 4 and 5 separated by a space 6, the inner wall 5 being screw threaded as in Fig 3. The plug 11 is screw threaded and projects from the top of the spout carrying part, the threads thereof engaging the threads of the wall 5. Surrounding the opening 1 is a seating piece 16 for the end of the plug so that when the plug is screwed down it seats upon this piece and closes the opening 1. By unscrewing this plug slightly the liquid may escape from the opening 1 and enter the space 6 and then pass out of the spout 7.

It will be seen that in both of these constructions the spout carrying part has two walls which are substantially parallel, one of these walls having screw threads to engage a screw threaded part, and the other wall carrying the spout, the walls being separated by a space, into which the liquid passes before passing out of the spout. By means of this construction it will be noted that the entire device can be made very short or low, due to the fact that the part carrying the spout, and the part carrying the threads, can overlap. This permits the device to be made as low or short as if the spout part had no threads. This is an important feature, because it permits the cans to be placed in boxes of less depth than would otherwise be necessary, thereby decreasing the expense of boxing, and it also is cheaper to manufacture. This construction also secures a more even flow of the material, because the liquid, before passing to the spout, enters the chamber 6, and while the quantity of liquid in this chamber may be varied by air bubbles entering the can, there is always enough to fill the spout, so that an even or steady flow is secured. The chamber 6, therefore, with the air vent in the back, takes care of the air as well as the liquid, permitting the liquid to pass out of the can and the air into the can without disturbing the flow of the liquid from the spout.

The device is applicable to cans, bottles or any other receptacle for containing liquids and from which it is desired to pour the liquid.

In the claims I have used the word "threaded" to indicate a characteristic of certain parts, but it is to be understood that I use the term in its broad significance to mean any equivalent construction whereby the relative rotation of these two parts which are described as threaded, causes them to move relatively in the longitudinal direction.

I claim:

1. The combination with a receptacle of a hollow part substantially uniform in diameter throughout its length and connected with said receptacle and communicating with the interior thereof, said hollow part provided with a screw thread extending to the outer end thereof, a rotatable spout-carrying part comprising a top and two over-lapping walls separated by a space, one of said walls carrying the spout, the other wall being provided with a screw thread, said screw thread engaging the screw thread on said hollow part, said rotatable spout-carrying part being shorter than the threaded portion of said hollow part, the top of the spout-carrying part engaging the outer threaded end of the hollow part when the spout-carrying part is rotated in one direction so as to shut off communication with the interior of the receptacle, the top of said spout-carrying part being moved away from the outer end of said hollow part when the spout-carrying part is rotated in the opposite direction.

2. The combination with a receptacle, of a movable spout carrying part having inner and outer over-lapping walls separated by a space, a spout connected with the outer wall and communicating with said space, the inner wall provided with threads, a threaded part within the spout carrying part and engaging the threads on the inner wall, said receptacle provided with an opening through which liquid may pass to said space and said spout, the passage of liquid through said opening being controlled by the relative movement of said threaded part and spout carrying part, the outer wall carrying the spout being provided with a hole, at the back thereof and connecting said space with the outside atmosphere, said hole being open during all of the various positions of said threaded part and said spout-carrying part.

3. The combination with a receptacle, of a hollow threaded part connected with said receptacle and communicating with the interior thereof, a rotatable spout carrying part comprising a top and two overlapping walls separated by a space, one of the walls carrying the spout, the other wall being threaded and engaging said threaded part, said top provided with a flat non-metallic inner face adapted to engage the end of the threaded part when the spout carrying part is rotated in one direction so as to shut off communication between the interior of the receptacle and said space, and adapted to be moved away from the end of said threaded part when the spout carrying part is rotated in the other direction, so as to establish communication between the interior of the receptacle and said space.

In testimony whereof, I affix my signature in the presence of two witnesses this 5th day of March, 1915.

LOSSIE E. ANDERSON.

Witnesses:
MINNIE M. LINDENAU,
ELLA THIEME.